(12) United States Patent
Dessi' et al.

(10) Patent No.: US 12,427,970 B2
(45) Date of Patent: Sep. 30, 2025

(54) DOWN-SHIFT ACCELERATION OVERSHOOT COMPENSATION IN AUTOMOTIVE ELECTRONIC LONGITUDINAL DYNAMICS CONTROL OF AUTONOMOUS MOTOR VEHICLES

(71) Applicant: C.R.F. SOCIETA' CONSORTILE PER AZIONI, Orbassano (IT)

(72) Inventors: Riccardo Dessi', Orbassano (IT); Enrico Raffone, Orbassano (IT); Claudio Rei, Orbassano (IT); Massimo Fossanetti, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 0 days.

(21) Appl. No.: 18/699,973

(22) PCT Filed: Oct. 13, 2022

(86) PCT No.: PCT/IB2022/059810
§ 371 (c)(1),
(2) Date: Apr. 10, 2024

(87) PCT Pub. No.: WO2023/062569
PCT Pub. Date: Apr. 20, 2023

(65) Prior Publication Data
US 2025/0236279 A1 Jul. 24, 2025

(30) Foreign Application Priority Data
Oct. 13, 2021 (IT) .................. 102021000026240

(51) Int. Cl.
*B60W 10/06* (2006.01)
*B60W 10/11* (2012.01)
*B60W 30/19* (2012.01)

(52) U.S. Cl.
CPC ............ *B60W 10/06* (2013.01); *B60W 10/11* (2013.01); *B60W 30/19* (2013.01);
(Continued)

(58) Field of Classification Search
CPC ...... B60W 10/06; B60W 10/11; B60W 30/19; B60W 2510/0657; B60W 2520/10; B60W 2520/105; B60W 2710/0666
(Continued)

(56) References Cited

U.S. PATENT DOCUMENTS

| 11,866,049 B1* | 1/2024 | LaRoche ............... B60W 10/06 |
| 2008/0109142 A1* | 5/2008 | Endo .................. B60K 6/445 |
| | | 903/930 |

(Continued)

FOREIGN PATENT DOCUMENTS

| EP | 2226230 A1 | 9/2010 |
| EP | 2230144 A1 | 9/2010 |
| EP | 2239175 A1 | 10/2010 |
| WO | WO-2023053055 A1 | 4/2023 |

OTHER PUBLICATIONS

International Search Report and Written Opinion of the ISA issued in PCT/IB2022/059810, mailed Jan. 19, 2023; ISA/EP.

*Primary Examiner* — Roger L Pang
(74) *Attorney, Agent, or Firm* — Harness, Dickey & Pierce, P.L.C.

(57) ABSTRACT

An automotive electronic longitudinal dynamics control system of a motor vehicle comprising a powertrain comprising a propulsor electronically controlled by an electronic engine control module and an automatic transmission electronically controlled by an electronic automatic transmission control module to transmit mechanical power generated by the propulsor to drive wheels of the motor vehicle and comprising an automatic gearbox having a plurality of gears
(Continued)

with corresponding gear ratios. The electronic automatic transmission control module is designed to output data indicative of a currently engaged gear and a next engaged gear that will be engaged after the currently engaged gear. The electronic engine control module is designed to receive data indicative of an engine torque request and to responsively control the propulsor based on the received engine torque request to cause the propulsor to output an engine torque equal to the requested engine torque. The automotive electronic longitudinal dynamics control system is designed to:

- receive from the electronic automatic transmission control module data indicative of the currently engaged gear and the next engaged gear that will be engaged after the currently engaged gear;
- receive a reference longitudinal acceleration to be followed and a measured longitudinal acceleration;
- compute an engine torque request for the electronic engine control module based on a longitudinal acceleration error indicative of a deviation of the measured longitudinal acceleration from the reference longitudinal acceleration, on a control law and on the currently engaged gear and the next engaged gear.

7 Claims, 4 Drawing Sheets

(52) U.S. Cl.
CPC . *B60W 2510/0657* (2013.01); *B60W 2520/10* (2013.01); *B60W 2520/105* (2013.01); *B60W 2710/0666* (2013.01)

(58) Field of Classification Search
USPC .............................................. 701/54, 60, 61
See application file for complete search history.

(56) References Cited

U.S. PATENT DOCUMENTS

2008/0300744 A1* 12/2008 Katsuta ................. B60W 30/19
701/1
2023/0339450 A1* 10/2023 Lee ........................ B60W 10/11

* cited by examiner

DOWN-SHIFT ACCELERATION OVERSHOOT COMPENSATION IN AUTOMOTIVE ELECTRONIC LONGITUDINAL DYNAMICS CONTROL OF AUTONOMOUS MOTOR VEHICLES

CROSS-REFERENCE TO RELATED APPLICATIONS

This patent application is a U.S. National Phase Application under 35 U.S.C. 371 of International Application No. PCT/IB2022/059810, filed on Oct. 13, 2022, which claims the benefit of Italian patent application no. 102021000026240 filed on Oct. 13, 2021. The entire disclosures of the above identified applications are incorporated herein by reference.

TECHNICAL FIELD OF THE INVENTION

The present invention relates in general to the longitudinal dynamics control of motor vehicles, in particular of self-driving or autonomous motor vehicles, to which the following disclosure will explicitly refer without thereby losing generality.

In particular, the present invention relates to the over-acceleration or acceleration overshoot compensation which usually occurs during down-shifting in the electronic longitudinal dynamics control of motor vehicles by means of a predictive integral action desaturation technique.

STATE OF THE ART

Figure 1:
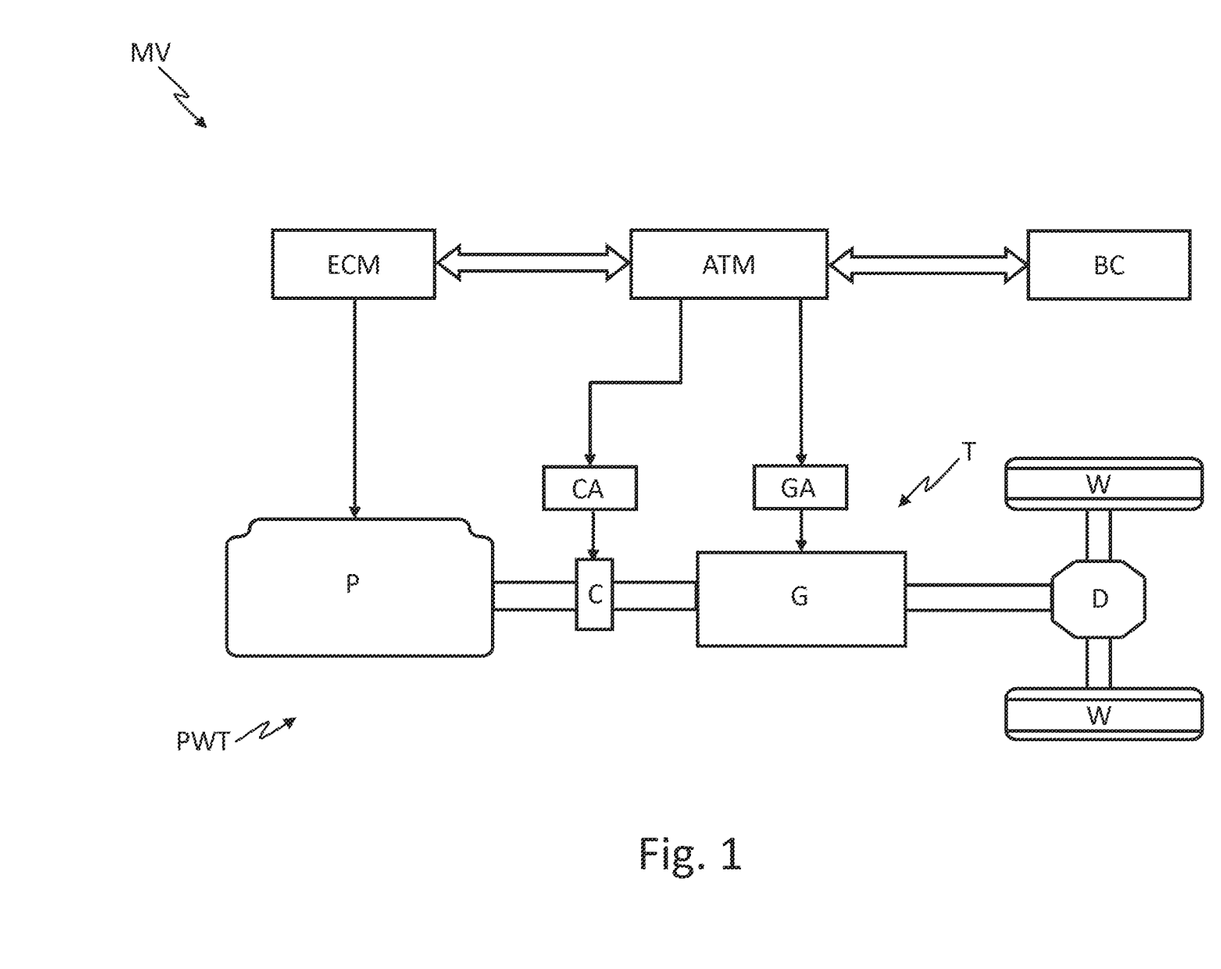
FIG. 1 shows a block diagram of an automotive powertrain.

As is known, self-driving or autonomous motor vehicles are equipped with powertrains of the type schematically shown in FIG. 1 and each comprising a propulsor P of any type (internal combustion, electric, hybrid) and an automatic or servo-actuated drivetrain or driveline T arranged to couplie the propulsor P to drive wheels W to transmit mechanical power generated by the propulsor P to the drive wheels W.

The drivelines T can be of the single-clutch type, as shown in FIG. 1, or of the dual-clutch type (not shown).

Single-clutch drivelines T each comprise a gearbox G with discrete gear ratios and coupled to the propulsor P by means of a single clutch C external to the gearbox G, and to the drive wheels W of the motor vehicle MV by means of a differential D.

The clutch C is servo-controlled by means of an associated electrically or electro-hydraulically controlled actuator CA. The gearbox G is also servo-controlled by means of a plurality of electrically or electro-hydraulically controlled actuators, collectively indicated by GA, which can be operated to engage and disengage the gears corresponding to the different gear ratios or speeds of the gearbox G.

The dual-clutch drivelines T each comprise, instead of a single clutch C external to the gearbox G, two separate clutches (not shown) integrated within the gearbox G, one associated with even gear ratios and the other associated with odd gear ratios.

The powertrains PWT are electronically managed by automotive electronic control units mutually communicating via automotive communication networks, such as high-speed CANs, also known as C-CANs, FlexRays or others, and dedicated to the electronic control of respective electronically controllable components of the powertrains PWT.

In particular, the propulsor P is electronically controlled by a first electronic engine control unit, known as Engine Control Module ECM, while the driveline T is electronically controlled by a second electronic control unit, known as Automatic Transmission Module ATM.

ECM and ATM also communicate with an onboard computer BC programmed to receive, via the automotive communication network, quantities indicative of operating conditions of onboard systems/components of the motor vehicle MV, such as the powertrain PWT, the battery/batteries, the various manual controls such as accelerator pedal, brake pedal, handbrake, etc., and to manage operation of the powertrain PWT accordingly.

In a different embodiment not shown, ECM and ATM can be integrated into a single electronic control unit that performs the functions of both.

ATMs are programmed to manage autonomously gear changes according to different modes designed to shift gears according to different logics aimed at achieving different objectives. Typically, the different gear-shifting modes comprise a so-called eco mode, which favours fuel consumption reduction and, thus, polluting emission reductions, compared to powertrain performance and driving comfort; a sport mode, which favours powertrain performance compared to fuel consumption and driving comfort; and a comfort mode, which favours driving comfort compared to powertrain performance and fuel consumption.

Longitudinal dynamics of self-driving or autonomous motor vehicles, i.e., longitudinal speed and acceleration, is electronically controlled by an electronic longitudinal dynamics control system traditionally functionally implemented by the electronic braking system control unit, known as Breaking System Module BSM, which is also dedicated to implementing the automotive Electric Power Steering EPS, and the automotive Electronic Stability Control ESC, which are designed to cooperate synergistically to implement an integrated automotive electronic control system for controlling the lateral dynamics of the self-driving or autonomous motor vehicle.

Electronic longitudinal dynamics control systems of self-driving or autonomous motor vehicles, called Lateral Dynamics Modules LDM in the following for the sake of brevity, traditionally each comprise two nested control loops comprising an internal longitudinal acceleration control loop, implementing a controller typically with integral action, i.e., a Proportional-Integral (PI) or a Proportional-Integral-Derivative (PID) controller, and the other is an external longitudinal speed control loop, implementing a controller typically without integral action, e.g., a Proportional controller, which inputs the internal control loop with a reference longitudinal acceleration to be followed.

As is known, from a mathematical point of view, controllers are dynamic systems that process an input signal e(t), called error, as a difference between a reference r(t) and a controlled variable y(t), i.e., e(t)=r(t)−y(t), and output a control signal u(t).

With respect to the external control loop, the reference is a reference longitudinal speed $v_{ref}(t)$, the controlled variable is the measured longitudinal speed a(t) and the control signal is a reference longitudinal acceleration $a_{ref}(t)$ for the internal control loop and computed based on a longitudinal speed error $e_v(t)$ indicative of a deviation of the measured longitudinal speed v(t) from the reference longitudinal speed $v_{ref}(t)$ and on a control law $f_v(t)$ of the controller implemented by the external control loop.

As for the internal control loop, the reference is the reference longitudinal acceleration $a_{ref}(t)$ received from the external control loop, the controlled variable a the measured longitudinal acceleration a(t) and the control signal is an engine torque request ET(t) for the ECM indicative of a desired engine torque to be outputted by the propulsor P and computed based on a longitudinal acceleration error $e_a(t)$) indicative of a deviation of the measured longitudinal acceleration a(t) from the reference longitudinal acceleration $a_{ref}(t)$ and on a control law $f_a(t)$ of the controller implemented by the internal control loop.

The Applicant has experienced that traditional propulsor management logics based on an engine torque interface, in itself relatively slow, and without the possibility of acting directly on the management of gear shifting, inasmuch as the latter is managed autonomously by the ATM based on one of the above-indicated gear-shifting modes, may give rise to problems induced by discontinuities that can occur in automatic gear shifting in a shifting phase.

Figure 2:
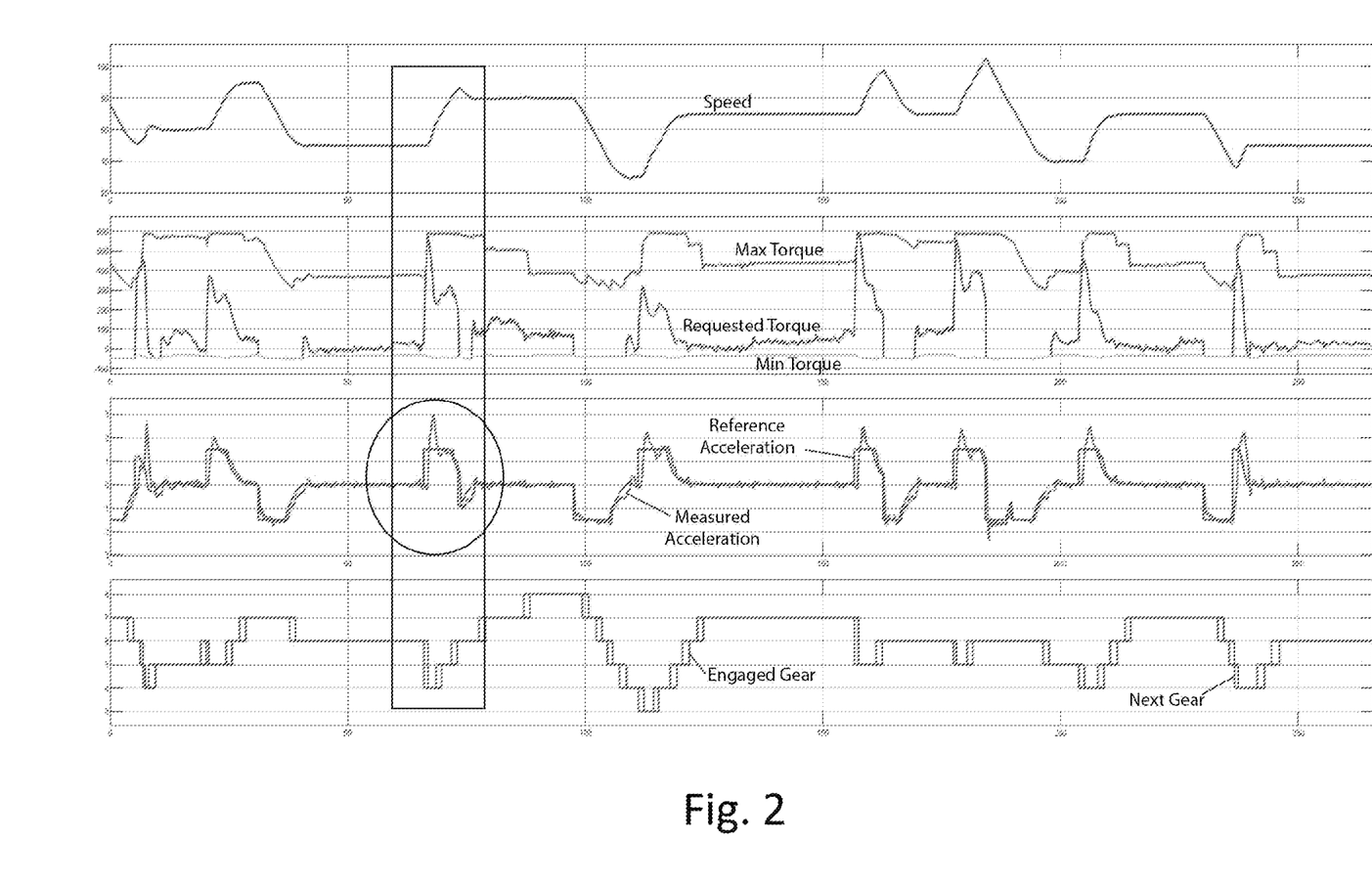
FIG. 2 shows time trends of automotive quantities involved in the longitudinal dynamics control of an autonomous motor vehicle according to the prior art.

These problems are appreciable in the graphs shown in FIG. 2, which displays the time trend of the motor-vehicle longitudinal speed (first graph from the top), of the engine torque request (second graph from the top), of the motor-vehicle longitudinal acceleration (third graph from the top) and of the engaged gear (fourth graph from the top).

As may be appreciated in the highlighted part of the graphs, especially at low speeds of the motor vehicle, it can occur that, in a pickup phase, i.e., when the motor vehicle is requested to accelerate, the automatic gearbox may downshift to satisfy the acceleration request. In this phase, the engine torque request is affected by the operating condition that preceded the downshifting where, with a higher gear (smaller ratio), the engine torque request increases accordingly to satisfy the acceleration request with the same ratio. As soon as downshifting occurs, the new engaged gear no longer conforms to the acceleration request and accordingly causes an annoying acceleration overshoot perceptible by the driver and passengers, thus rendering the driving comfort disagreeable.

EP 2 226 230 A1 discloses a method for controlling a gear shifting in an automatic manual transmission for shifting from a current gear to a next gear. The automatic transmission comprises a gearbox, which is equipped with at least one primary shaft and at least one secondary shaft which are connected to drive wheels, and at least one clutch interposed between the primary shaft of the gearbox and a driveshaft of an engine. The control method comprises the steps of determining, when the clutch is at least partially closed, a target torque to be transmitted via the clutch; determining, when the clutch is at least partially closed, a target rotational speed of the driveshaft of the engine; and determining a target engine torque of the engine as a function of the target engine torque to be transmitted via the clutch and as a function of the target rotational speed of the driveshaft of the engine.

EP 2 239 175 A1 discloses a method for controlling a vehicle equipped with an automatic manual transmission during a gear shifting or during an acceleration. The control method comprises the steps of determining, in a design phase, a clutch transmissibility function that provides the torque transmitted by the clutch as a function of the degree of opening of said clutch; determining, in a design phase, an engine model; determining a target torque to be transmitted via the clutch during the gear shifting or acceleration; controlling the clutch so as to follow the target torque to be transmitted via the clutch using the transmissibility function; determining a target engine torque of the engine as a function of the target engine torque to be transmitted via the clutch; and controlling the engine so as to follow the target engine torque of the engine using an open loop control based on the engine model.

EP 2 230 144 A1 discloses a control method for carrying out a gear shifting in an automatic manual transmission equipped with a dual-clutch gearbox in order to shift from a current shorter gear to a subsequent longer gear. The control method comprises the steps of receiving a gear-shift command; opening a first clutch associated with the current gear; closing a second clutch associated with the subsequent gear in a same first moment; completing the opening of the first clutch associated with the current gear and completing the closing of the second clutch associated with the subsequent gear in a same closing moment; keeping the rotational speed of the driveshaft of the engine constant and equal to an initial value imposed by the gear ratio of the current gear until the closing moment at which the opening of the first clutch is completed; after the closing moment, progressively decreasing the rotational speed of the driveshaft of the engine from the initial value imposed by the gear ratio of the current gear to a final value imposed by the gear ratio of the subsequent gear; and temporarily overextending the second clutch after the closing moment so that the second clutch temporarily transmits additional torque which causes a progressive reduction of the rotational speed of the driveshaft from the initial value to the final value.

OBJECT AND SUMMARY OF THE INVENTION

The object of the present invention is to provide a solution which allows the above-indicated drawback to be overcome.

According to the present invention, an automotive electronic longitudinal dynamics control system of a motor vehicle, in particular a self-driving or autonomous motor vehicle, is provided, as claimed in the appended claims.

DESCRIPTION OF PREFERRED EMBODIMENTS OF THE INVENTION

The present invention will now be described in detail with reference to the accompanying figures in order to enable a person skilled in the art to manufacture it and use it. Various modifications to the described embodiments will be immediately evident to those skilled in the art and the general principles described can be applied to other embodiments and applications without thereby departing from the scope of protection of the present invention, as defined in the appended claims. Therefore, the present invention is not to be considered limited to the described and illustrated embodiments, but it must be conceded the broadest scope of protection in line with the described and claimed characteristics.

Unless defined otherwise, all the technical and scientific terms used herein have the same meaning as commonly used by persons of ordinary experience in the pertinent field of the present invention. In the event of conflict, the present description, comprising the provided definitions, shall be binding. Furthermore, the examples are provided for the purposes of illustration only and as such are not to be considered limiting.

In particular, the block diagrams included in the accompanying figures and described in the following are not to be understood as representations of the structural characteristics, i.e. as constructional limitations, but are to be interpreted as representations of functional characteristics, i.e. features intrinsic to the devices and defined by the effects obtained, i.e. as functional limitations, and which can be implemented in different manners, i.e. so as to safeguard the functionalities of the device (its ability to function).

In order to facilitate the comprehension of the embodiments described herein, reference will be made to some specific embodiments and a specific language will be used to describe the same. The terminology used in the present document is only intended to describe particular embodiments and is not intended to limit the scope of the present invention.

The present invention is essentially based on the idea of adapting the engine torque request to the ECM by exploiting information from the ATM, which, in addition to the classic information regarding the currently engaged gear $g_i$, also provides information regarding the next engaged gear $g_{i+1}$ that will be engaged after the currently engaged gear.

In particular, the following equation can be written based on the wheel torque equilibrium principle:

$$ET(t,g_i) \cdot R(g_i) = ET(t, g_{i+1}) \cdot R(g_{i+1})$$

where $R(g_i)$ is the gear ratio of the currently engaged gear $g_i$ and $R(g_{i+1})$ is the gear ratio of the next engaged gear $g_{i+1}$ that will be engaged after the currently engaged gear.

From this equation, it is thus possible to obtain the following:

$$ET(t, g_{i+1}) = \frac{R(g_i)}{R(g_{i+1})} \cdot ET(t, g_i)$$

wherein $ET(t, g_{i+1})$ represents an adjusted torque request that would need to be sent to the ECM in the event that the next engaged gear $g_{i+1}$ is engaged instead of the currently engaged gear $g_i$, and the ratio $$\frac{R(g_i)}{R(g_{i+1})},$$

indicated in the following as $\lambda$ for the sake of brevity, represents a fit factor which can be used to adapt the engine torque request $ET(t, g_i)$ computed by the LDM based on the currently engaged gear $g_i$ in order to take into account the gear shift that the ATM will command, i.e., the next engaged gear $g_{i+1}$ that will be engaged after the currently engaged gear $g_i$.

In this manner, the engine torque request $ET(t, g_i)$, which in the state of the art would give rise to above-described acceleration overshoot as a result of the downshifting carried out by the automatic gearbox in a pickup phase, is adjusted by a factor A which takes into account such a downshifting and which in particular is proportional to the ratio between the speed ratios $R(g_i)$ and $R(g_i+_1)$ of the currently engaged gear $g_i$ and the next engaged gear $g_{i+1}$ that will be engaged after the currently engaged gear.

In a downshifting phase, in fact, the speed ratio $R(g_i)$ of the currently engaged gear $g_i$ is lower than the speed ratio $R(g_{i+1})$ of the next engaged gear $g_{i+1}$ that will be engaged after the currently engaged gear, which results in a fit factor $\lambda$ lower than the unit that accordingly reduces the engine torque request $ET(t, g_i)$ that otherwise would have been sent to the ECM, thus significantly reducing the acceleration overshoot caused by the downshifting carried out by the automatic transmission in a pickup phase, with clear benefits for the perceived driving comfort of the driver and passengers of the vehicle.

The person skilled in the art may appreciate that the fit factor $\lambda$ could be computed based on the gear ratios $R(g_i)$ and $R(g_{i+1})$ of the currently engaged gear $g_i$ and the next engaged gear $g_{i+1}$ using a different function, also more complex than the one indicated above, which is anyway suitable for achieving the same object, i.e., adapting the engine torque request $ET(t, g_i)$ so as to take into account the next gear shift.

Merely by way of example, the fit factor $\lambda$ could be computed based on, in particular the ratio between, the engine regimes (rpms) with the currently engaged gear $g_i$ and the next engaged gear $g_{i+1}$.

Similarly, the person skilled in the art may also appreciate that the engine torque request $ET(t, g_i)$ could be adjusted based on the fit factor $\lambda$ in a manner different from the one indicated above.

For example, the fit factor A, instead of simply multiplying the engine torque request $ET(t, g_i)$, could be used as an anti-wind-up in the control law $f(e_a(t), g_i)$ of the controller implemented by the LDM.

In fact, as is known, in controllers in a PI or PID configuration, typically but not necessarily implemented by the internal longitudinal acceleration control loop, the proportional action makes a contribution to the output represented by the engine torque request $ET(t, g_i)$ proportional to the longitudinal acceleration error $e_a(t)$ via a constant $K_P$ called proportional gain; the integral action makes a contribution to the engine torque request $ET(t, g_i)$ proportional to the integral of the longitudinal acceleration error $e_a(t)$, therefore proportional to its average value, via a constant $K_I$ equal to the inverse of an integral time constant $T_I$, also called reset time, multiplied by the proportional gain Kr; and the derivative action makes a contribution to the engine torque request $ET(t, g_i)$ proportional to the derivative of the longitudinal acceleration error $e_a(t)$, therefore proportional to its variation over time, via a constant $K_D$ equal to a derivative time constant $T_D$ multiplied by the proportional gain $K_P$.

It is likewise known that actuators used in control systems have constraints to the amplitudes of the outputs, which cannot exceed maximum and minimum limits. Typically, in fact, an actuator has an input/output characteristic with a linear intermediate section and two saturation sections arranged on opposite sides of the linear section and at which the actuator output assumes respective minimum and maximum saturation limits independently of the amplitude of the input.

When a controller with integral action is used, it is possible for the actuator output to reach the maximum and minimum saturation limits and in such a case, although the integral action continues to increase also in the presence of a non-zero longitudinal acceleration error $e_a(t)$, this increase has no effect on the response of the controlled system.

Besides making the actuator not function correctly, this operating situation also renders it inactive when the error decreases or its sign is inverted; in fact, the controller is only able to reactivate itself when the actuator output re-enters the linearity zone of its input/output characteristic (desaturation of the integral term). This phenomenon is commonly called integral wind-up.

The wind-up phenomenon can be remedied using so-called anti-wind-up techniques, i.e., anti-saturation or desaturation techniques for hindering a saturation of the actuator outputs.

A first anti-wind-up technique is known by the initials IMC, an acronym for Internal Model Control, since a model of the process to be controlled is required, the model of the process to be controlled is internal to the controller and the controller uses the model of the process to be controlled to enhance performance. In essence, the operation of this anti-wind-up technique is based on the assumption that the process to be controlled is known so that it is possible to obtain a copy of the same and integrate said copy in the controller.

A second anti-wind-up technique consists in the desaturation of the actuator outputs via the interruption of the integral action as soon as the output u(t) of the controller reaches the saturation level of the actuator.

A third anti-wind-up technique consists, on the other hand, in the back-computation of the integral action via the introduction of a term $e_r(t)$ that is equal to the difference between the actuator output v(t) and the controller output u(t), which constitutes the actuator input or command, i.e., $e_r(t)=v(t)-u(t)$, and which is returned to the input of the integral block and subtracted from the error e(t). This will yield a zero value which, as a result, will not affect the control in any way if the actuator is working within the saturation limits, whereas, when these limits are exceeded, a value will be generated which will help dampen the growth of the integral action.

A fourth anti-wind-up technique is the one disclosed in Italian patent application No. 102021000025079 filed on 30 Sep. 2021 by the Applicant, the contents of which are incorporated herein in their entirety by reference.

For example, in the anti-wind-up technique with back-computation of the integral action, the fit factor X could be used to gradually desaturate the integral action desaturation with a term computed as follows:

$$Gain_{anti\text{-}wind\text{-}up} \cdot (ET(t,g_i) \cdot \lambda - ET(t,g_i)) \text{ where } ET(t,g_i) \cdot \lambda = ET(t,g_i+)$$

Figure 3:
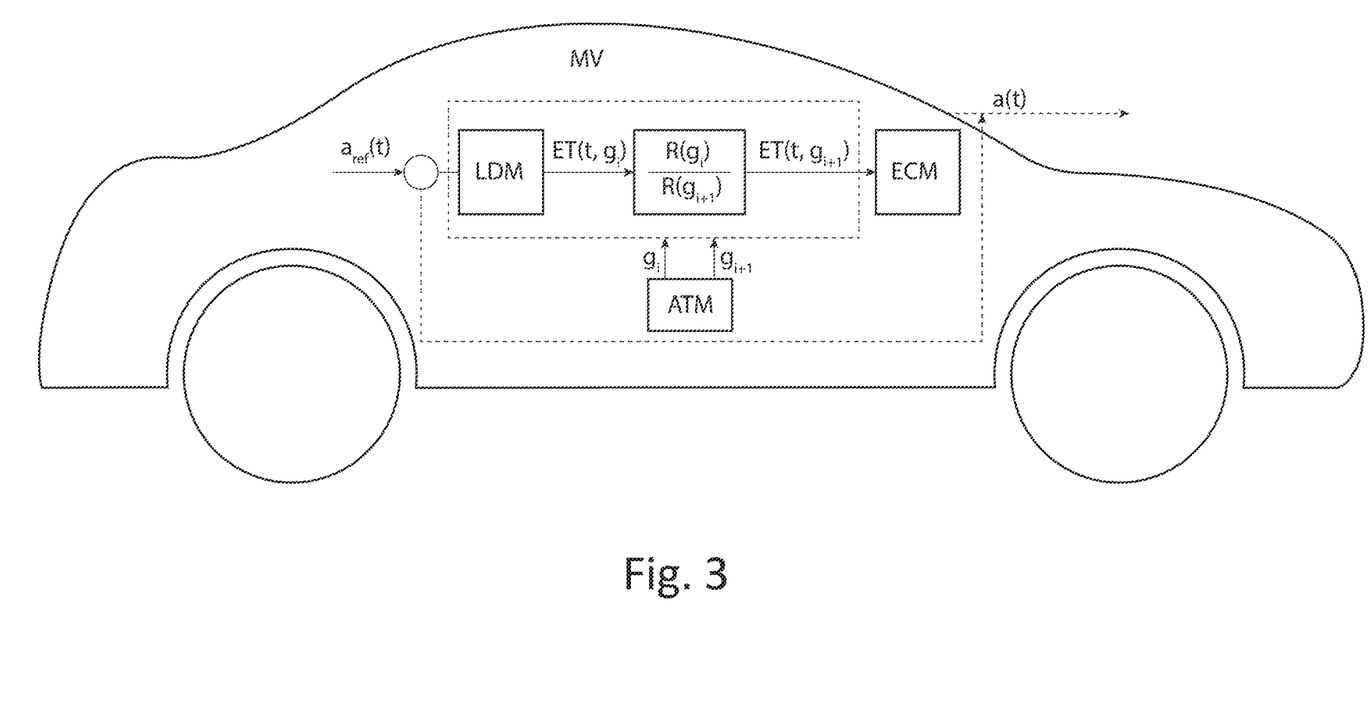
FIG. 3 shows a block diagram of an electronic longitudinal dynamics control of an autonomous motor vehicle according to the present invention.

The basic idea of the present invention described in the foregoing is illustrated schematically in FIG. 3, which shows a block diagram of an automotive electronic system, indicated as a whole by ECS, of an autonomous motor vehicle MV.

The automotive electronic system ECS comprises:
the ECM, which receives data indicative of an engine torque request $ET(t, g_i)$ and responsively controls the propulsor P based on the engine torque request $ET(t, g_i)$ to cause the propulsor P to output an engine torque equal to the requested engine torque;
the ATM, which outputs data indicative of the currently engaged gear $g_i$ and the next engaged gear $g_{i+1}$; and
the LDM, of which only the internal longitudinal acceleration control loop, typically with integral action, i.e., of a PI or PID type, is shown in FIG. 3 for the purposes of illustration, which LDM is designed to:
receive from the ATM data indicative of the currently engaged gear $g_i$ and the next engaged gear $g_{i+1}$;
receive from the external longitudinal speed control loop (not shown) a reference longitudinal acceleration $a_{ref}(t)$ to be followed;
receive from the automotive communication network the measured longitudinal acceleration a(t) of the motor vehicle MV;
compute the aforementioned fit factor $\lambda$ based on the gear ratios $R(g_i)$ and $R(g_{i+1})$ of the currently engaged gear $g_i$ and of the next engaged gear $g_{i+1}$ that will be engaged after the currently engaged gear; and,
compute the engine torque request $ET(t, g_{i+1})$ based on a longitudinal acceleration error ea(t) indicative of a deviation of the measured longitudinal acceleration a(t) from the reference longitudinal acceleration $a_{ref}(t)$, on the currently engaged gear $g_i$, on the next engaged gear $g_{i+1}$ and on the control law $f(ea(t), g_i)$ of the controller implemented by the LDM, typically a controller with integral action, i.e., of a PI or PID type.

In particular, in the above-described embodiment, the fit factor $\lambda$ is computed as a ratio between the gear ratios $R(g_i)$ and $R(g_{i+1})$ of the currently engaged gear $g_i$ and of the next engaged gear $g_{i+1}$ that will be engaged after the currently engaged gear.

In a different embodiment, the fit factor $\lambda$ could be computed using different functions.

Furthermore, in the above-described embodiment, the current engine torque request $ET(t, g_i)$ is adjusted by first computing a current engine torque request $ET(t,g_i)$ based on the longitudinal acceleration error $e_a(t)$, on the control law $f(e_a(t), g_i)$ of the controller implemented by the LDM, typically of a PI or PID type, and on the currently engaged gear $g_i$, and then computing an adjusted engine torque request $ET(t_{,gi+1})$ based on the current engine torque request $ET(t, g_1)$ and the fit factor A.

In a different embodiment, the current engine torque request $ET(t, g_i)$ could be adjusted using different functions that take into account the next gear shift between the currently engaged gear $g_i$ and the next engaged gear $g_{i+1}$.

Figure 4:
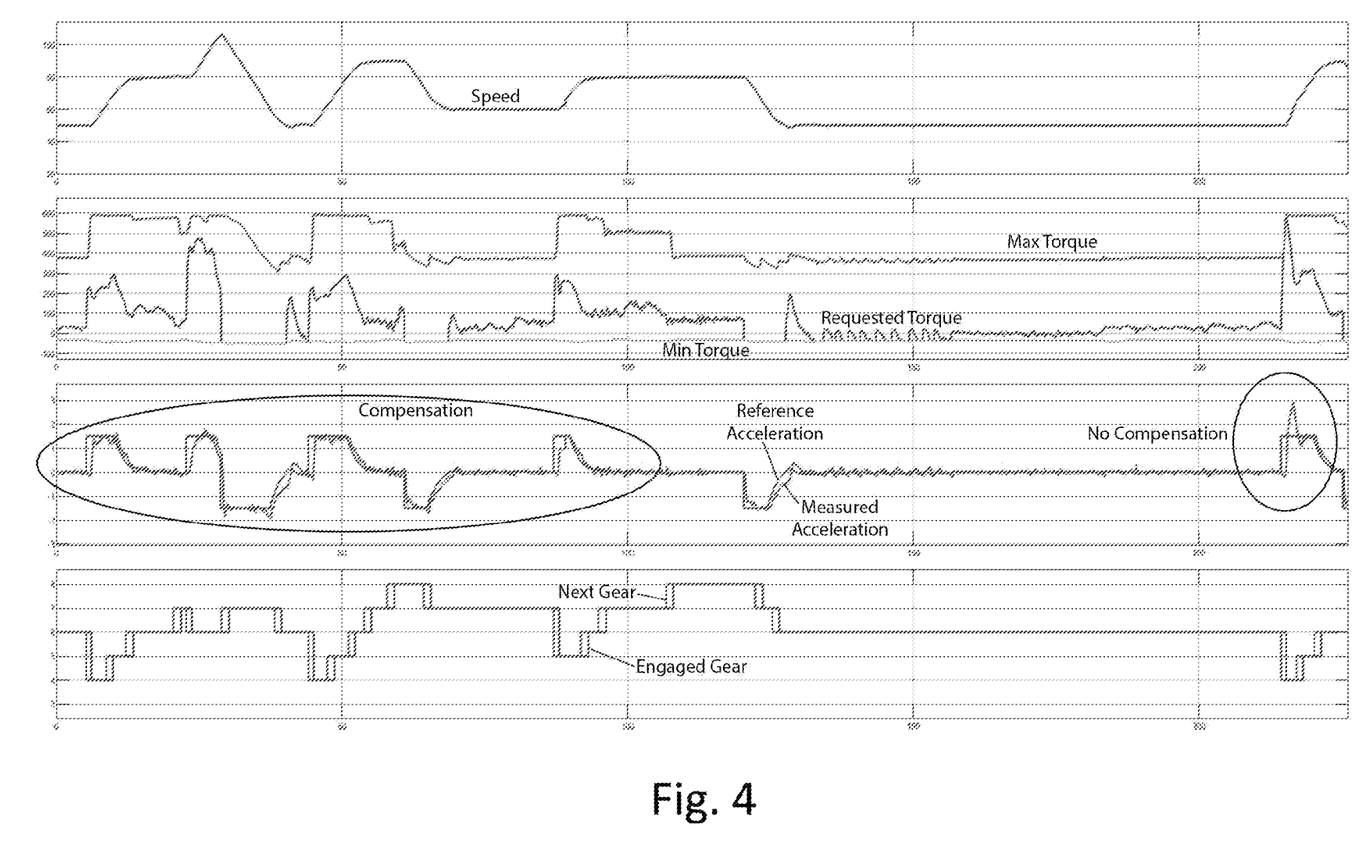
FIG. 4 shows time trends of automotive quantities involved in the longitudinal dynamics control of an autonomous motor vehicle according to the present invention.

The benefits that the present invention allows to achieve are depicted in FIG. 4, which shows time trends of the same automotive quantities shown in FIG. 2, both with and without the implementation of the present invention. With particular reference to the longitudinal acceleration (third graph from the top), it may be appreciated in the first half of the time scale the significant reduction in longitudinal acceleration overshoot obtained by means of the implementation of the present invention while, in the second half of the time scale, it may be appreciated the significant increase in longitudinal acceleration overshoot obtained without the implementation of the present invention.

The invention claimed is:

1. An automotive electronic longitudinal dynamics control system (LDM) of a motor vehicle (MV);
the motor vehicle (MV) comprises a powertrain (PWT) comprising a propulsor (P) electronically controlled by an electronic engine control module (ECM) and an automatic transmission (T) electronically controlled by an electronic automatic transmission control module (ATM) to transmit mechanical power generated by the propulsor (P) to drive wheels (W) of the motor vehicle (MV) and comprising an automatic gearbox (G) having a plurality of gears ($g_i$) with corresponding gear ratios ($R(g_i)$);
the electronic automatic transmission control module (ATM) is designed to output data indicative of a currently engaged gear ($g_i$) and a next engaged gear ($g_{i+1}$) that will be engaged after the currently engaged gear ($g_i$);

the electronic engine control module (ECM) is designed to receive data indicative of an engine torque request (ET(t, $g_i$)) and to responsively control the propulsor (P) based on the received engine torque request (ET(t, $g_i$)) to cause the propulsor (P) to output an engine torque equal to the requested engine torque ((ET(t, $g_i$));

the automotive electronic longitudinal dynamics control system (LDM) is designed to:

receive from the electronic automatic transmission control module (ATM) data indicative of the currently engaged gear ($g_i$) and the next engaged gear ($g_{i+1}$) that will be engaged after the currently engaged gear ($g_i$);

receive a reference quantity indicative of a reference longitudinal dynamics ($a_{ref}$(t)) to be followed and a measured quantity indicative of a measured longitudinal dynamics (a(t));

compute the engine torque request (ET(t,$g_i$)) for the electronic engine control module (ECM) based on a longitudinal dynamics error ($e_a$(t)) indicative of a deviation of the measured longitudinal dynamics (a(t)) from the reference longitudinal dynamics ($a_{ref}$(t)), on a control law (f($e_a$(t), $g_i$)) and on the currently engaged gear ($g_i$) and the next engaged gear ($g_{i+1}$);

the automotive electronic longitudinal dynamics control system (LDM) is characterized in that it is further designed to:

compute a current engine torque request (ET(t, $g_i$)) based on the longitudinal dynamics error ($e_a$(t)), the control law (f($e_a$(t), $g_i$)) and the currently engaged gear ($g_i$);

compute a fit factor (k) based on the gear ratios (R($g_i$), R($g_{i+1}$)) of the currently engaged gear ($g_i$) and the next engaged gear ($g_{i+1}$); and compute an adjusted engine torque request (ET(t, $g_{i+1}$)) based on the current engine torque request (ET(t, $g_i$)) and the fit factor (k).

2. The automotive electronic longitudinal dynamics control system (LDM) of claim 1, wherein the fit factor (k) is computed based on a ratio between the gear ratios (R($g_i$), R($g_{i+1}$)) of the currently engaged gear ($g_i$) and the next engaged gear ($g_{i+1}$).

3. The automotive electronic longitudinal dynamics control system (LDM) of claim 1, wherein the adjusted engine torque request (ET(t, $g_{i+1}$)) is computed based on a product of the current engine torque request (ET(t, $g_i$)) and the fit factor ($\lambda$).

4. The automotive electronic longitudinal dynamics control system (LDM) of claim 1, wherein the control law (f($e_a$(t), $g_i$)) comprises an integral action designed to provide an integral contribution to the engine torque request (ET(t, $g_i$)) proportional dynamics to the integral of the longitudinal dynamics error ($e_a$(t));

the automotive electronic longitudinal dynamics control system (LDM) is designed to implement an anti-wind-up system designed to gradually desaturate the integral action of the control law (f($e_a$(t), $g_i$));

and the anti-wind-up system is designed to operate based on the fit factor ($\lambda$).

5. The automotive electronic longitudinal dynamics control system (LDM) of claim 1, wherein the reference quantity is indicative of a reference longitudinal acceleration ($a_{ref}$(t)) and the measured quantity is indicative of a measured longitudinal acceleration (a(t)).

6. The automotive electronic longitudinal dynamics control system (LDM) of claim 5, further comprising two nested control loops with an external loop designed to control the longitudinal speed of the motor vehicle (MV) and an internal loop designed to control the longitudinal acceleration of the motor vehicle (MV);

the external control loop is configured to receive a reference longitudinal speed ($v_{ref}$(t)) to be followed and a measured longitudinal speed (v(t)) and to output a reference longitudinal acceleration ($a_{ref}$(t)) for the internal control loop based on a longitudinal speed error ($e_v$(t)) indicative of a deviation of the measured longitudinal velocity speed (v(t)) from the reference longitudinal speed ($v_{ref}$(t)) and on a control law ($f_v$(t));

the internal control loop is configured to receive the reference longitudinal acceleration ($a_{ref}$(t)) from the external control loop and a measured longitudinal acceleration (a(t)) and to output an engine torque request (ET(t)) for the electronic engine control module (ECM) based on a longitudinal acceleration error ($e_a$(t)) indicative of a deviation of the measured longitudinal acceleration (a(t)) from the reference longitudinal acceleration ($a_{ref}$(t)) and on a control law ($f_a$(t)).

7. An automotive electronic control system (ECS) of a motor vehicle (MV) comprising a powertrain (PWT) comprising a propulsor (P) and an automatic transmission (T) to transmit mechanical power generated by the propulsor (P) to drive wheels (W) of the motor vehicle (MV), and comprising an automatic gearbox (G) having a plurality of gears ($g_i$) with corresponding gear ratios (R($g_i$));

the automotive electronic control system (ECS) comprises:

an electronic automatic transmission control module (ATM) designed to output data indicative of a currently engaged gear ($g_i$) and a next engaged gear ($g_{i+1}$) that will be engaged after the currently engaged gear ($g_i$);

an electronic engine control module (ECM) designed to receive data indicative of an engine torque request (ET(t, $g_i$)) and to responsively control the propulsor (P) based on the received engine torque request (ET(t, $g_i$)) to cause the propulsor (P) to output an engine torque equal to the requested engine torque request (ET(t, $g_i$)); and the automotive electronic longitudinal dynamics control system (LDM) of claim 1.

* * * * *